United States Patent [19]

Brown

[11] 4,096,761

[45] Jun. 27, 1978

[54] APPARATUS AND METHOD FOR INCREMENTALLY ROTATING A SHAFT

[75] Inventor: Keith E. Brown, Solon, Ohio

[73] Assignee: Addressograph-Multigraph Corporation, Cleveland, Ohio

[21] Appl. No.: 705,688

[22] Filed: Jul. 15, 1976

[51] Int. Cl.² .......................................... F16H 27/02
[52] U.S. Cl. ...................................... 74/128; 74/126
[58] Field of Search ............... 74/117, 111, 112, 89.2, 74/142, 126–128, 133, 25; 254/175.5, 138

[56] References Cited

U.S. PATENT DOCUMENTS

| 170,933 | 12/1875 | Bourdin | 74/136 |
|---|---|---|---|
| 584,964 | 10/1895 | Connable | 254/138 |
| 876,936 | 1/1908 | Bradway | 74/139 |
| 2,507,756 | 5/1950 | Boylan | 74/112 |
| 2,904,167 | 9/1959 | Guess | 74/117 |
| 2,952,159 | 9/1960 | Pegard | 74/138 |

FOREIGN PATENT DOCUMENTS

| 54,087 | 11/1967 | Germany | 254/175.5 |
|---|---|---|---|
| 1,037,797 | 8/1958 | Germany | 74/112 |
| 358,688 | 4/1938 | Italy | 74/89.2 |

*Primary Examiner*—Benjamin W. Wyche
*Assistant Examiner*—Wesley S. Ratliff, Jr.
*Attorney, Agent, or Firm*—Russell L. Root

[57] ABSTRACT

An apparatus and method for incrementally advancing a shaft by a selected rotational amount. The apparatus includes a belt trained about a pair of space driven pulleys, the belt forming both first and second runs between the pulleys. Each pulley is associated with a shaft and is mounted for rotation in one direction only, with brake means designed to resist rotation of the pulley in the opposite direction. Means are provided for alternately deflecting the first and second runs of the belt to advance each shaft by an incremental amount in the one direction. In this manner, either or both shafts can be used for whatever purposes an incrementally advancing shaft is needed or desired.

4 Claims, 4 Drawing Figures

APPARATUS AND METHOD FOR INCREMENTALLY ROTATING A SHAFT

BACKGROUND AND SUMMARY OF THE INVENTION

This application relates to an apparatus and method for incrementally advancing a shaft by a selected rotational amount. There are numerous instances in both mechanical and electrical applications where it becomes either necessary or desirable to incrementally advance a shaft by a selected rotational amount.

The present invention provides what is believed to be a simple and yet efficient apparatus and method to incrementally advance a shaft by a selected rotational amount. The invention provides for incremental advancing of a shaft by means of a drive mechanism which can be continuously operated and which coacts with the remaining elements to result in periodic incremental rotation of the shaft. The invention further provides for ready adjustability of the amount of incremental rotation.

According to one aspect of the invention, a belt is trained about a pair of spaced driven pulleys, the belt forming both first and second runs between the pulleys. Each driven pulley is associated with a shaft and is mounted for rotation in one direction only, with brake means designed to resist rotation of the pulley in the opposite direction. Means are provided for alternately deflecting the first and second runs of the belt from their normal pulley-to-pulley paths to advance each shaft by an incremental amount in the one direction. The pulleys are rotatable in the same hand, i.e., clockwise or counterclockwise. Then, by deflecting the belt laterally of its initial track, e.g., by drawing the belt between the pulleys on either run, a length of belt must draw off of at least one pulley. However, since neither pulley can reverse, and since both have the same orientation, only one will rotate and allow the belt to move. Hence, that one pulley and shaft is rotated. The degree of rotation is determined by the extent of belt deflection. Then, by removing the deflecting force from the first run, while applying a deflecting force on opposite run, the other pulley and shaft are rotated a like amount. In this manner, either or both shafts can be used for whatever purposes an incrementally advancing shaft is needed or desired.

According to the preferred embodiment the means for alternately deflecting the first and second runs of the belt includes a first means in engagement with the first run of the belt and adapted to continuously apply a first deflecting force against the first run of the belt having a component which is normal to the surface of the belt. There is also provided a second means for periodically applying a second deflecting force to the second run of the belt and in a direction having a component normal to the surface of the belt for alternately deflecting the first and second runs of the belt to advance each shaft by an incremental amount. The magnitude of the deflecting travel of the second deflecting means is adjustable so as to adjust the amount of incremental advancement which is effected.

The present invention further provides a method of incrementally advancing a shaft. A pair of driven pulleys are each associated with a respective shaft and a belt is trained about the pulleys. The pulleys are mounted for rotation in one direction and are locked against rotation in an opposite direction. The degree of deflection of the first and second runs of the belt is alternately increased and decreased in order to advance each of the shafts by a selected incremental amount in the one direction.

BRIEF DESCRIPTION OF THE DRAWINGS

The further objects and advantages of the present invention will become further apparent from the following description taken with reference to the accompanying drawings wherein.

DETAILED DESCRIPTION OF THE PREFERRED EMBODIMENT

As noted above, the present invention relates to an apparatus and method for incrementally advancing a shaft by a selected rotational amount. The following description sets forth the details of the preferred apparatus for effecting such incremental rotation of a shaft. It is believed that the many and varied uses to which such incremental shaft rotation can be put, as well as the various ways in which such shaft rotation can be achieved in accordance with the principles of the present invention will become readily apparent to those of ordinary skill in the art.

Figure 1:
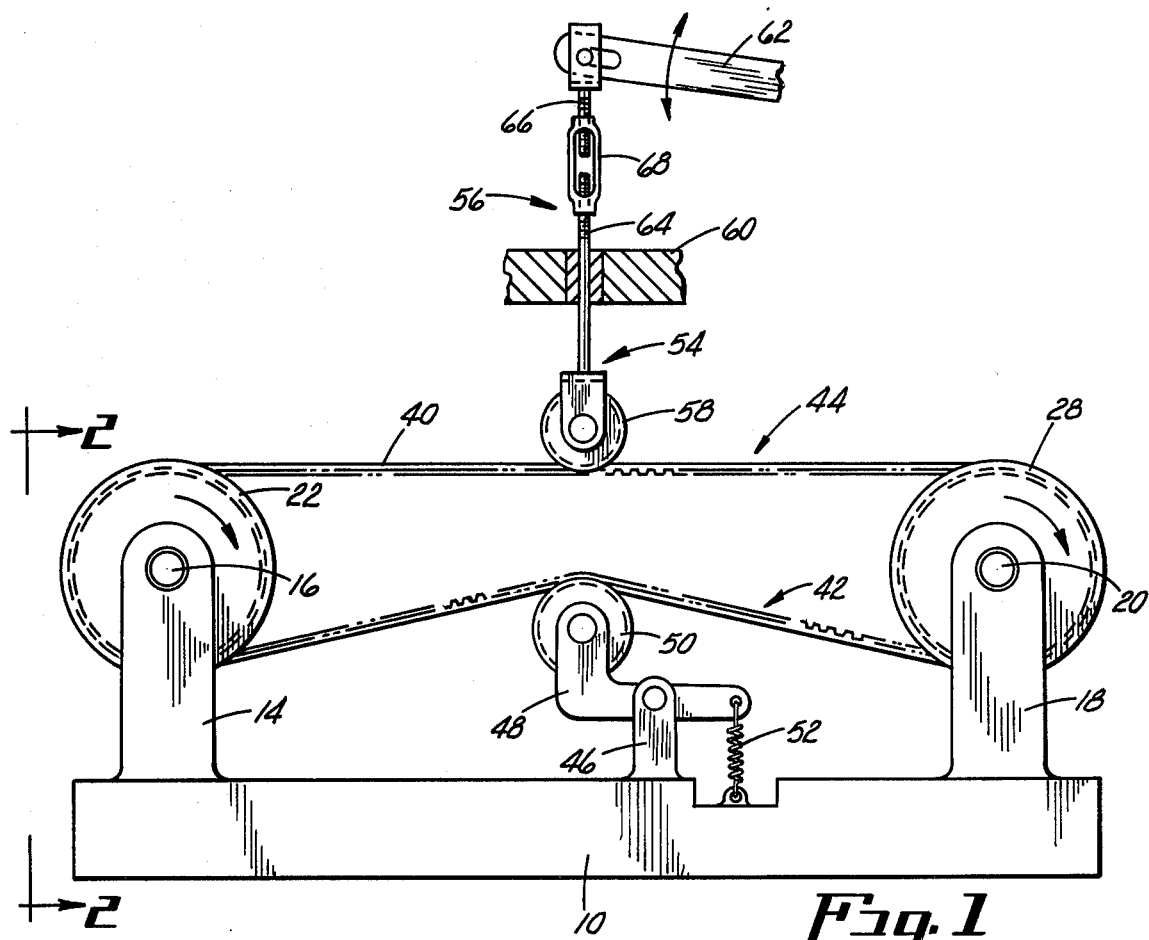
FIG. 1 is a side view of an apparatus for incrementally advancing a shaft in accordance with the principles of the present invention.
Figure 2:
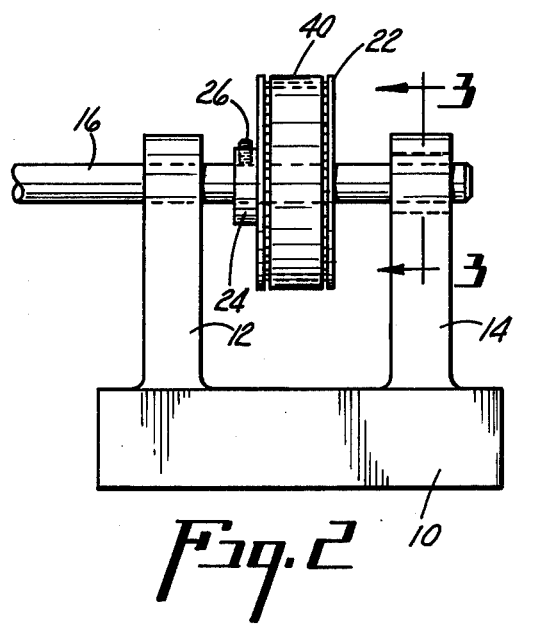
FIG. 2 is a partial end view of the apparatus of FIG. 1 taken from the direction 2—2.

In FIGS. 1 and 2 a fixed support member 10 includes a first pair of vertically extending spaced apart standards 12, 14 having a shaft 16 journaled therein for rotation in a manner to be set forth more fully hereinafter. A second pair of vertically extending standards includes vertically upstanding standard 18. This second pair of vertically upstanding standards supports a second shaft 20 in spaced relation to shaft 16.

A pair of spaced apart pulleys are provided, each of which is mounted on a respective one of the shafts 16, 20. Referring to FIGS. 1 and 2, pulley 22 includes an integral collar 24. The shaft 16 passes through a central bore in the pulley 22 and the collar 24, and a locking screw 26 serves to clampingly engage the collar 24 and pulley 22 with the shaft 16 so that they are rotatable together. The mounting of the second pulley 28 on the shaft 20 is effected in a similar manner. Of course, there are various other obvious ways that the pulleys 22, 28 could be connected with their respective shafts, as will be readily apparent to those of ordinary skill in the art.

Figure 3:
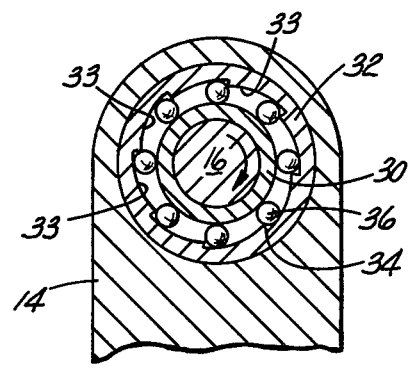
FIG. 3 is a sectional view of the apparatus of FIG. 2, taken from the directon 3—3.

Each of the pulley shafts is mounted for rotation in one direction only, with rotation in the other direction being substantially blocked. Referring to FIG. 3, shaft 16 includes a collar 30 which is fixed thereon and which is journaled for rotation in standard 14. A fixed ring 32 is provided in fixed relation to the standard 14, and includes a series of locking cam surfaces 33 facing inwardly toward the collar 30 and each terminating in a locking tooth 34. Between the collar and the ring 32 there are provided in plurality of locking members in the form of rollers 36 disposed between the ring 32 and the collar 30. The diameter of the rollers 36 is large enough so that they cannot move in a clockwise direction beyond their respective locking teeth 34, and as the shaft 16 attempts to rotate in a counter-clockwise direction the rollers become jammed between the collar 30 and their respective cam surfaces 33 on the ring 32. Thus, as shaft 16 rotates in a clockwise direction, as shown by the arrow in FIG. 3, collar 30 rotates therewith and rollers 36 remain lodged in substantially the position shown in FIG. 3 and in which position they do not interfere with rotation of shaft 16. If forces were applied tending to rotate the shaft 16 in the opposite, i.e., counter-clockwise, direction the rollers 36 would instantly become jammed between the cam surfaces 33 of ring 32 and collar 30, thus locking collar 30 and shaft 16 against rotation in the counter-clockwise direction. Similar structure is associated with shaft 20, so that both shafts 16 and 20 are free to rotate in the clockwise direction but are blocked against rotation in the counter-clockwise direction.

The mechanism above-described constitutes a one-way brake mechanism for each of the shafts, and various types of conventional one-way brake mechanisms can be substituted if desired, as will be readily understood.

A belt 40 is trained about both pulleys 22, 28. Belt 40 is a continuous fixed length substantially nonstretchable belt and includes a first, or lower, run 42 and a second, or upper, run 44 between the pulleys 22, 28.

In accordance with the invention the pulleys, and thereby the shafts 16, 20 are rotated in a clockwise direction by an incremental amount by alternately increasing and decreasing the amount of deflection of the first and second runs of the belt 40. A standard 46 is fixed to support 10 and pivotally mounts an L-shaped member 48. One end of the L-shaped member 48 rotatably mounts a roller 50. The other end of the L-shaped member is biased by means of a spring 52 in a clockwise direction bringing roller 50 into engagement with the first run 42 of belt 40 and with sufficient force to force the first run of the belt inwardly and thereby to apply a continuous force against the first run 42 of the belt sufficient to hold it consistently taut.

Further, according to the invention, there is provided a means for alternately deflecting the second run 44 of the belt to incrementally advance the shafts 16, 20 by a selected rotational amount. This means applies sufficient force to the belt to overcome the bias of the spring 52, thereby allowing the run 44 to deflect by an amount determined by the travel of its deflecting means. Referring to FIG. 1, the means for alternately deflecting the second run of the belt includes a drive member 54 formed by a shaft 56 having a roller 58 at its lower end. A fixed support 60 allows the shaft 56 to move vertically as shown in FIG. 1 but constrains the shaft 56 against movement in any other direction. Moving the shaft 56 in a downward direction causes the roller 58 to apply a downward force on the upper run 44 of the belt. This force on the upper run 44 tends to draw run 44 toward the space between the pulleys but, since pulley 28 cannot rotate counter-clockwise, the belt will rotate only the pulley 22. The force on the upper run 44 overcomes the deflection provided through spring 52 and causes belt movement around pulley 22 and serves to rotate pulley 22 and shaft 16 in a clockwise direction. Since the belt runs are at substantially equal tension at all times, there is, of course, no unbalanced force tending to rotate pulley 28 in a clockwise direction, and it remains stationary. As shaft 56 is moved in an upward direction, the deflection provided by spring 52 and roller 50 against the lower run 42 causes a drive for pulley 28 similar to the drive action described for pulley 22. The return drive of roller 50 serves to keep the belt taut by deflecting the bottom run 42 and thereby rotating only the pulley 28 and shaft 20 in a clockwise direction. Thus, the combination of the constant bias on lower run 42, and the alternate deflecting and withdrawal motion applied to the upper belt run 44 serves to rotate shafts 16, 20 alternately in a clockwise direction and by a selected incremental amount. Because the shafts are mounted in the manner set forth above they are blocked against rotation in a counter-clockwise direction.

One arrangement for axially shifting the shaft 56 is shown in FIG. 1, and includes a lever 62 which is oscillated through a predetermined angle in any well-known manner. The pin and slot connection between shaft 56 and lever 62, along with the mounting of shaft 56 in the fixed support 60, translates the oscillation of lever 62 into linear oscillating movement of shaft 56 in an up and down direction.

The preferred embodiment of this invention further provides for adjusting the amount of rotation of the pulleys 22, 28 during each increment of movement. In FIG. 1, shaft 56 includes a pair of sections 64, 66 which are interconnected by a turnbuckle 68. This allows adjustment of the length of shaft 56 in a well-known manner, and thereby provides a means for determining what portion of the shaft stroke will be in interfering relationship with the belt, and hence determining the maximum degree of deflection attained at maximum throw of the lever 62. Put another way, this adjustment may be said to control the effective stroke of the belt deflecting means. Thus the amount of belt deflection, and the resulting amount of incremental rotation of the shafts 16, 20 and of the pulleys, can be readily adjusted.

Figure 4:
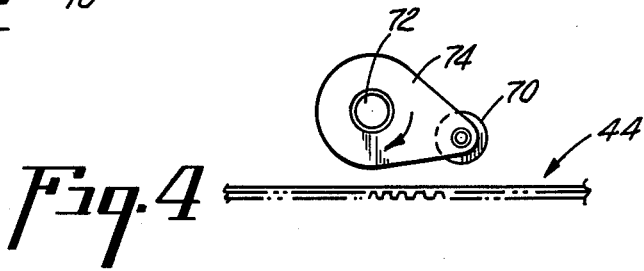
FIG. 4 is a partial side view of a modified apparatus for incrementally advancing a shaft in accordance with the principles of the present invention.

The present invention further contemplates many other forms of apparatus for deflecting the upper belt run 44. One such alternate arrangement is shown in FIG. 4 wherein is provided a roller 70 which is eccentrically mounted with respect to shaft 72 on an arm 74. As shown in FIG. 4, the arm 74 is rotated in a constant (e.g., clockwise) direction and this constant rotation periodically brings the roller 70 along a path in which it engages upper belt run 44 and serves to deflect it. In other positions of rotation the roller 70 is out of contact with upper belt run 44 thus serving to allow restoration as a result of the bias of spring 50 (FIG. 1).

It will be understood, of course, that the length of arm 74 can also be made adjustable so as to control the amount by which the pulleys 22, 28 are incrementally rotated, as discussed above in connection with the adjusting means 68 of FIG. 1.

As will be readily appreciated from the foregoing description, the present invention further provides a method for intermittently advancing the shafts 16, 20 by predetermined increments. The application and withdrawal of a deflecting force to the upper belt run, along with the continuously applied deflecting bias in the lower belt run serves to alternately deflect the first run and the second run of the belt 40, and thereby serve to intermittently rotate the shafts 16, 20 and their pulley in the same direction by predetermined increments.

In view of the foregoing description, it is believed that many and varied obvious modifications of the principles of the present invention will become readily apparent to those of ordinary skill in the art.

What is claimed is:

1. An apparatus for providing intermittent rotary motion in a predetermined direction comprising:
   an endless substantially nonstretchable belt;
   a pair of spaced driven pulleys around which said belt is trained with said belt having first and second continuous runs each disposed between said pulleys and each extending from one pulley to the other, said pulleys having their axes fixedly positioned and the length of the belt being such as to normally exhibit significant slack when thus trained arond the pulleys;
   means for preventing rotation of each pulley in one direction while permitting it in the other, the directions of permitted rotation of the pulleys being alike with respect to a single predetermined direction of belt travel;
   first deflecting means for alternately deflecting said first run of the belt in a direction transversely of its path and then withdrawing trom the deflecting position; and
   second deflecting means for alternately deflecting the second run of the belt in a direction transversely of its path and then withdrawing from the deflecting position, said first and second deflecting means being arranged for mutual coaction such that the deflecting and withdrawing actions alternate in opposite sense to the actions of the other so as to maintain said belt substantially taut about the pulleys, whereby the pulleys are alternately stepped in their permitted directions of rotation.

2. An apparatus as defined in claim 1 wherein said means for alternately deflecting said belt runs comprise means for continuously biasing said first run of said belt in a deflecting direction, and means for alternately applying a deflecting force against and withdrawing the same from said second run of said belt.

3. An apparatus as defined in claim 2 including means for adjusting the effective stroke of the means for alternately applying and withdrawing said force.

4. A method of generating intermittent rotary motion in a predetermined direction comprising the steps of:
   providing an endless substantially nonstretchable belt and a pair of fixed axis driven pulleys around which the belt is slackly trained so as to exhibit first and second continuous runs each extending from one pulley to the other;
   preventing rotation of each pulley in one direction while permitting it in the other, the directions of permitted rotation being alike with respect to a single predetermined direction of belt travel;
   so deflecting the belt runs transversely to the belt path as to maintain the belt taut about the pulleys, and
   alternately increasing the degree of transverse deflection of the first run while decreasing the transverse deflection of the second, and increasing the transverse deflection of the second run while decreasing the transverse deflection of the first, whereby the pulleys are alternately stepped in their permitted directions of rotation.

* * * * *